(12) United States Patent
Hayano et al.

(10) Patent No.: US 10,237,310 B2
(45) Date of Patent: *Mar. 19, 2019

(54) METHOD AND APPARATUS FOR CONTROLLING INFORMATION IN VIRTUAL WORLD

(71) Applicant: INTERNATIONAL BUSINESS MACHINES CORPORATION, Armonk, NY (US)

(72) Inventors: Seiya Hayano, Yokohama (JP); Shinji Iizuka, Yokohama (JP); Toshitaka Imai, Sagamihara (JP); Kohtaroh Miyamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/137,840

(22) Filed: Apr. 25, 2016

(65) Prior Publication Data

US 2016/0241613 A1 Aug. 18, 2016

Related U.S. Application Data

(63) Continuation of application No. 13/759,670, filed on Feb. 5, 2013, now Pat. No. 9,344,468, which is a continuation of application No. 12/268,488, filed on Nov. 11, 2008, now Pat. No. 8,386,566.

(30) Foreign Application Priority Data

Nov. 12, 2007 (JP) .................................. 2007-293646

(51) Int. Cl.
*G06F 15/16* (2006.01)
*H04L 29/06* (2006.01)
*H04L 12/18* (2006.01)
*H04L 12/58* (2006.01)

(52) U.S. Cl.
CPC ........ *H04L 65/403* (2013.01); *H04L 12/1822* (2013.01); *A63F 2300/5533* (2013.01); *A63F 2300/64* (2013.01); *H04L 51/04* (2013.01)

(58) Field of Classification Search
CPC . H04L 65/403; H04L 12/1822; H04L 12/581; H04L 51/04; A63F 2300/5533; A63F 2300/64

See application file for complete search history.

(56) References Cited

FOREIGN PATENT DOCUMENTS

| JP | H11250278 | 9/1999 |
|---|---|---|
| JP | 2001325202 | 11/2001 |

*Primary Examiner* — John B Walsh
(74) *Attorney, Agent, or Firm* — Tutunjian & Bitetto, P.C.; Jennifer R. Davis

(57) ABSTRACT

Provided is a method for controlling information shared in a virtual world by a server and a plurality of users' client terminals connected to each other through a network. In this information control method, a computer creates a third object between a first object and a second object in the virtual world when the first object and second object transmit communication information therebetween, and filters the information with the third object. In addition, when an object transmits visual information, the third object can be created around the object transmitting the visual information. The third object can be created as a pseudo wall.

20 Claims, 15 Drawing Sheets

METHOD AND APPARATUS FOR CONTROLLING INFORMATION IN VIRTUAL WORLD

BACKGROUND OF THE INVENTION

1. Field of the Invention

The present invention relates to a technique of controlling an element constituting a virtual world, in the virtual world.

2. Description of the Related Art

In a virtual world, a three-dimensional virtual space created by a server on a network is shared by multiple users' client terminals. In this virtual world, a character (hereinafter, referred to as an avatar) representing a user can move freely in the space, and can enjoy the virtual world, as if the virtual world were an extension in the real world, by communicating with the avatars of other users and by shopping. The virtual world is especially characterized in such a way that a large number of users from a wide variety of various places join the virtual world that a user can communicate with various unknown users in real time.

While allowing a user to communicate with an unspecified number of users, the virtual world is desired to provide an opportunity to communicate only among specified users. Japanese Patent Application Publication No. 2002-215553 describes a technique of constructing and controlling a space for a meeting, a lecture or the like, suited to communicate with specific users.

To be more precise, a moderator establishes a space, and has an authority to control operations executed by browsers of all users in the space. Types of such space include (1) a class room type, (2) a round table type, (3) a self-schooling type and (4) a compound type of a class room type and a round table type. In any type of space, all the avatars except for the moderator are not allowed to exchange information with another avatar outside the space. In (2) the round table type, participating users share information and are allowed to exchange information with each other through their avatars. In addition, the authority given to each avatar limits a range of the reach of a message from the avatar and a range of browsers controllable by the avatar. As described above, the conventional technique enables the access control for avatars existing inside the space by constructing and managing the space.

Accordingly, there are several problems with establishing and controlling a space in a virtual world. One problem is collision (interference) between objects belonging to a space and objects such as avatars existing inside the virtual world. As a result, the space itself and the objects are so restricted that they cannot operate or act flexibly. Moreover, it is difficult to allow only a remote avatar to enter the space by expanding the space, since an unnecessary avatar existing on the way to the remote avatar also inevitably enters the space. Another problem is that controllable accesses are limited. For example, controllable accesses can be limited only to accesses across the boundary of the space.

The aforementioned technique enables control only for accesses across the boundary of the space, but the access control for each object is needed in the virtual world. This is because a wide variety of objects exist in the virtual world and have different desires. Furthermore, in a virtual world, it is necessary to perform not only access control but also controls for communication information, visual information and information on object movements.

SUMMARY OF THE INVENTION

In consideration of the foregoing, the present invention provides a method and an apparatus for controlling information shared in a virtual world by a server and multiple users' client terminals connected through a network.

In one aspect, the present invention provides a method for controlling information shared in a virtual world by a server and a plurality of users' client terminals connected to each other through a network. In this information control method, a computer creates a third object between a first object and a second object in the virtual world when the first object and second object transmit communication information therebetween, and filters the information with the third object. In addition, when an object transmits visual information, the third object can be created around the object transmitting the visual information.

Here, an "object" denotes an object, including an avatar, which exists in the virtual world. The "communication information" denotes information exchanged between a first object and a second object, specifically, between avatars or between an object and an avatar to communicate with each other. A speech and chat are specific examples of the "communication information." The chat indicates the communication information in text. When information is exchanged, speeches sometimes overlap with each other, while chats never overlap with each other. This point is a difference between the speech and chat.

The "visual information" denotes information on the appearance of an object in the virtual world. Information on the appearance and brightness of an object is a specific example of the "visual information." In this description, a simple expression of "information" indicates both the communication information and the visual information. The "filtering" is to change information or to permit/prohibit passing. The filtering is performed by a third object created between a first object and a second object. The third object can be a pseudo wall, for example.

The third object is able to perform different kinds of filtering according to moving directions of information and another object. Moreover, the third object is able to permit another object to pass through the third object, and to prohibit still another object from passing therethrough.

In addition, another aspect of the present invention can be provided as a computer program to be executed on a computer, or a system having the computer program installed thereon.

According to the present invention, the third object that filters information is independent of an object in the virtual world. Third objects in the virtual world are not subject to the constraints of other objects that perform filtering. In other words, the third objects are free from the constraints due to a collision (interference), a distance and the like between the objects. Different kinds of filtering can be provided to the respective objects by creating the third object between objects that transmit communication information or around an object that transmits visual information.

Since the third object allows other objects to pass therethrough, the objects in the virtual world are not only free from the constraints of the object that performs the filtering, but they are also able to behave as if the third object were not present.

Furthermore, by setting the information to have a direction, the kind of filtering can be changed according to the direction of information transmission. In other words, a single third object is made capable of performing two or more different kinds of filtering according to the directions. This enables provision of services satisfying various demands of objects.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE PREFERRED EMBODIMENTS

Hereinafter, an embodiment of the present invention will be described by referring to the accompanying drawings. Here, "communication information" is described by taking, as specific examples, speech and chat, and "visual information" is described by taking, as a specific example, light representing the appearance and brightness of an object in the virtual world. The virtual world is composed of communication information, visual information and objects, i.e., more precisely, speech, chat, light and objects. These components are called virtual world components all together, and the components related to information (speech, chat and light) are particularly called virtual world component information.

Figure 1:
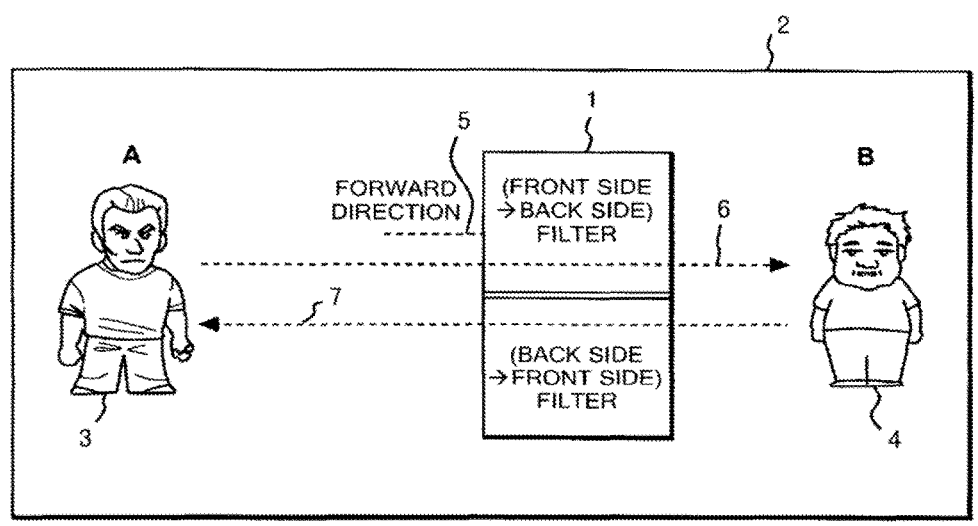
FIG. 1 shows a mechanism of filtering by a pseudo wall object.

FIG. 1 shows a mechanism of filtering by a pseudo wall object. The pseudo wall object is an object in a wall shape partitioning a space between two objects. In FIG. 1, a pseudo wall object 1 exists between an avatar 3 and an avatar 4. A dotted-line arrow 6 indicates virtual world component information transmitted from the avatar 3 to the avatar 4, and a dotted-line arrow 7 indicates virtual world component information transmitted from the avatar 4 to the avatar 3. As an example, the virtual world component information mentioned here is speech. The virtual world component information 6 transmitted from the avatar 3 and the virtual world component information 7 transmitted from the avatar 4 are filtered by the pseudo wall object 1 and then reach the avatar 4 and the avatar 3, respectively. In other words, the virtual world component information 6 from the avatar 3 to the pseudo wall object 1 is different from the virtual world component information 6 from the pseudo wall object 1 to the avatar 4, since the virtual world component information 6 is filtered by the pseudo wall object 1. Similarly, the virtual world component information 7 from the avatar 4 to the pseudo wall object 1 is different from the virtual world component information 7 from the pseudo wall object 1 to the avatar 3. Specific filtering functions by the pseudo wall object will be described later.

Here, in FIG. 1, one of the surfaces of the pseudo wall object is defined as a front side, and the other surface is defined as a back side. Since the pseudo wall object has the front and back sides, the pseudo wall object performs two kinds of filtering, one of which is for the case where the virtual world component information passes from the back side to the front side, and the other of which is for the case where the virtual world component information passes from the front side to the back side. Hereinafter, a forward direction 5 denotes a direction in which the virtual world component information passes from the front side to the back side, and a reverse direction denotes a direction in which the virtual world component information passes from the back side to the front side. The pseudo wall object 1 can differently filter the virtual world component information 6 and the virtual world component information 7. Thus, FIG. 1 shows that the pseudo wall object 1 has two filters, one of which is used for the virtual world component information passing from the front side, and the other of which is used for the virtual world component information passing from the back side. Moreover, an effective range can be set for the pseudo wall object. The effective range is a range covered by a function of the pseudo wall object. Here, in FIG. 1, assume that the pseudo wall object 1 is effective only for the avatar 3 and the avatar 4. In this case, the effective range is expressed as an effective range 2, and the pseudo wall object 1 has no effect on an avatar existing outside the effective range 2. The effective range either can be set by a user who is operating an avatar or it can be automatically determined by a distance.

Note that an independent object is not limited to the pseudo wall object in a wall shape, but can be, for example, a pseudo block object in a block shape, a pseudo curved surface object in a curved surface shape or the like. Since the pseudo wall object has a wall shape, a space can be created by combining pseudo wall objects with each other. Thus, such a space can also be used to filter the virtual world component information inside and outside the space.

In addition, a pseudo wall object is not always created between avatars as shown in FIG. 1, but can be created between an avatar and a material object, or between material objects. Here, the material object means a substance existing in the virtual world, and specially, a building, a piece of furniture, an automobile, an animal and the like.

The foregoing description has been for the mechanism of the pseudo wall object to filter the virtual world component information, instead of a mechanism of the pseudo wall object to filter virtual world components including objects. In the case of filtering an object, not information but the object itself, the object is filtered by the pseudo wall object.

In this regard, the two kinds of filtering are different from each other. Except for this point, however, there is no difference between the mechanism of filtering the virtual world component information, and the mechanism of filtering the object by means of the pseudo wall object. Accordingly, the following description will be provided without discriminating between the virtual world component information and the object.

Figure 2:
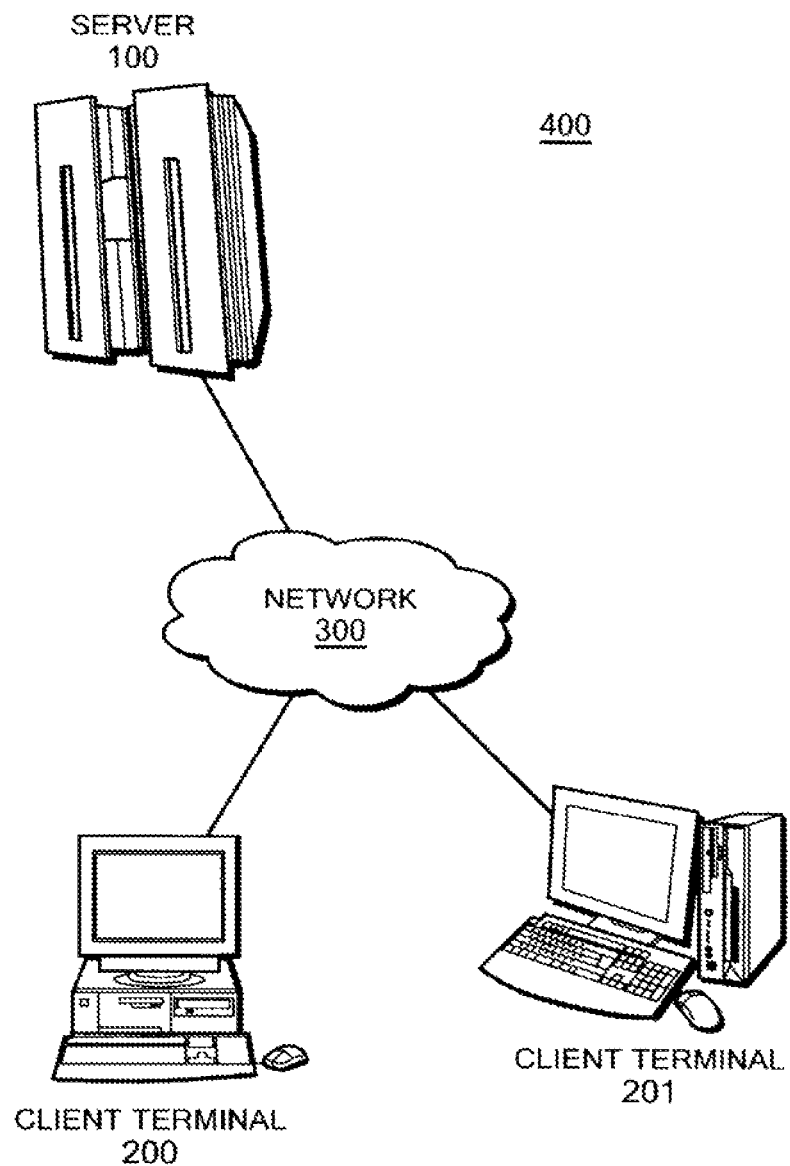
FIG. 2 shows an example of a network environment employable in an embodiment of the present invention.

A network environment employable in an embodiment of the present invention will be described. FIG. 2 shows one example of the network environment employable in the embodiment of the present invention. The virtual world is constructed by an information control system 400 configured to a server 100 and multiple client terminals (here, two client terminals 200 and 201 are illustrated) connected to a network 300. By operating the client terminal 200, a user can have a chat or the like with a user of the client terminal 201 through the network 300 and the server 100 in the virtual world. Note that two or more servers can be employed as the server 100 (called a server, below), and three or more client terminals can be employed as the client terminals 200 and 201 (collectively called a client terminal, below).

Figure 3:
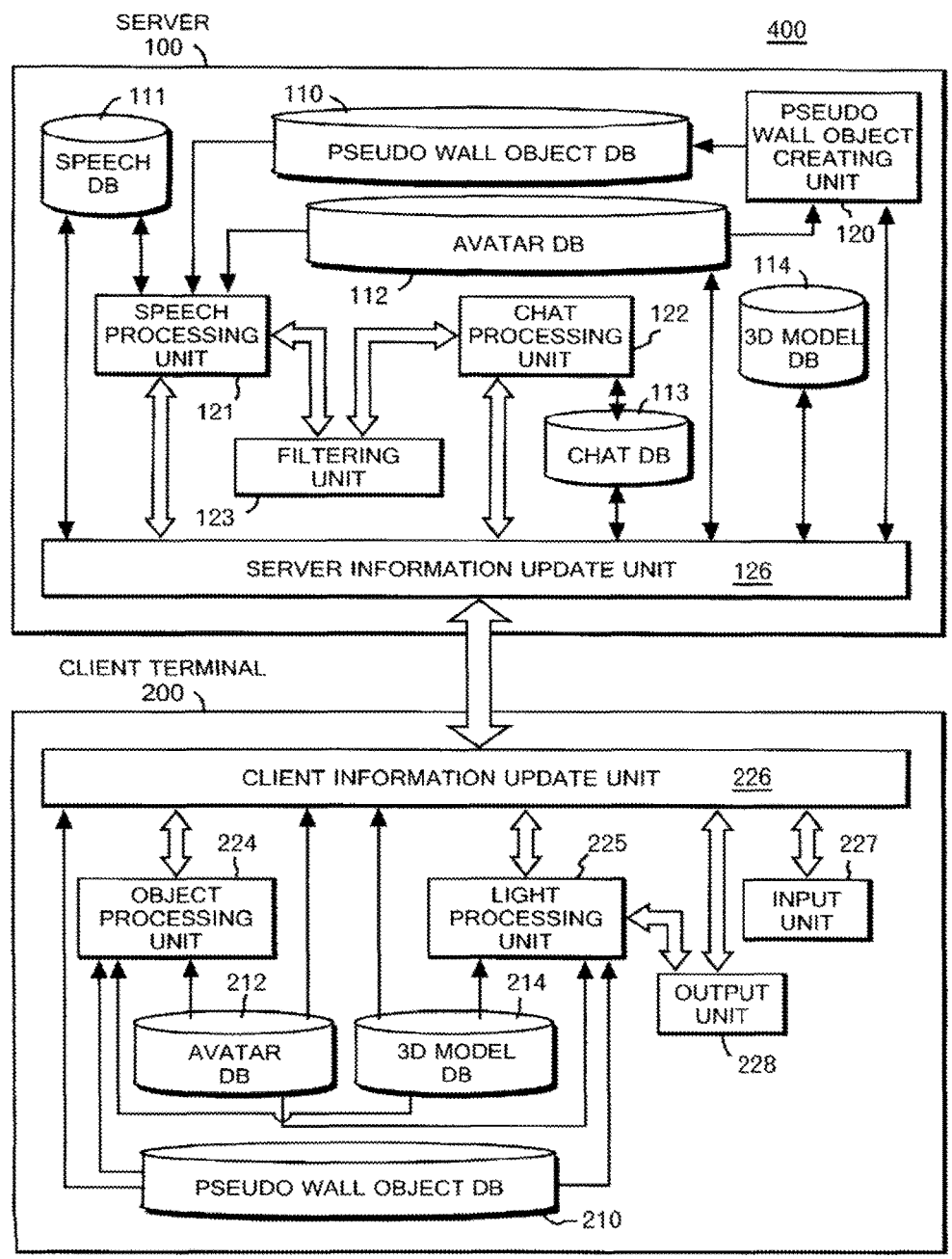
FIG. 3 shows examples of system configuration diagrams of a client terminal and a server according to the embodiment of the present invention.

FIG. 3 shows detailed configurations of the client terminal and the server. FIG. 3 shows one example of a system configuration diagram of the client terminal and the server according to the embodiment of the present invention. Hereinafter, a database is simply referred to as a DB. The server includes a pseudo wall object DB 110, a speech DB 111, an avatar DB 112, a chat DB 113, a 3D model DB 114, a pseudo wall object creating unit 120, a speech processing unit 121, a chat processing unit 122, a filtering unit 123 and a server information update unit 126. On the other hand, the client terminal includes a pseudo wall object DB 210, an avatar DB 212, a 3D model DB 214, an object processing unit 224, a light processing unit 225, a client information update unit 226, an input unit 227 and an output unit 228. Although both of the server and the client terminal have the respective pseudo wall object DBs, avatar DBs and 3D model DBs, the server and the client terminal are different in that the server has the information on all the avatars while the client terminal has the information only on an avatar of the user of the client terminal.

The pseudo wall object creating unit 120 is one example of a third object creating unit, and the server information update unit 126 is one example of an information update unit. The client terminal also includes the same information update unit, and transmits and receives information to and from the server. The pseudo wall object DBs 110 and 210 are examples of a third object storage unit. The speech DB 111 and the chat DB 113 are examples of a communication information storage unit. The avatar DBs 112 and 212 are examples of a visual information storage unit. The 3D model DBs 114 and 214 are examples of a movement information storage unit.

In this embodiment, a filtering processing unit includes the speech processing unit 121, the chat processing unit 122, the filtering unit 123, the object processing unit 224 and the light processing unit 225. While the server includes the filtering unit 123, the client terminal has no such filtering unit. This is because the filtering processing in the client terminal is performed by the object processing unit 224 and the light processing unit 225. In this way, the filtering unit can be provided inside each processing unit or be provided independently. Moreover, each storage unit is not limited to a DB provided on a hard disk, but can be an external storage device such as a memory, a magnetic tape or a flexible disk. Hardware configurations of the server and the client terminal will be described in the last part of this specification.

Figure 4:
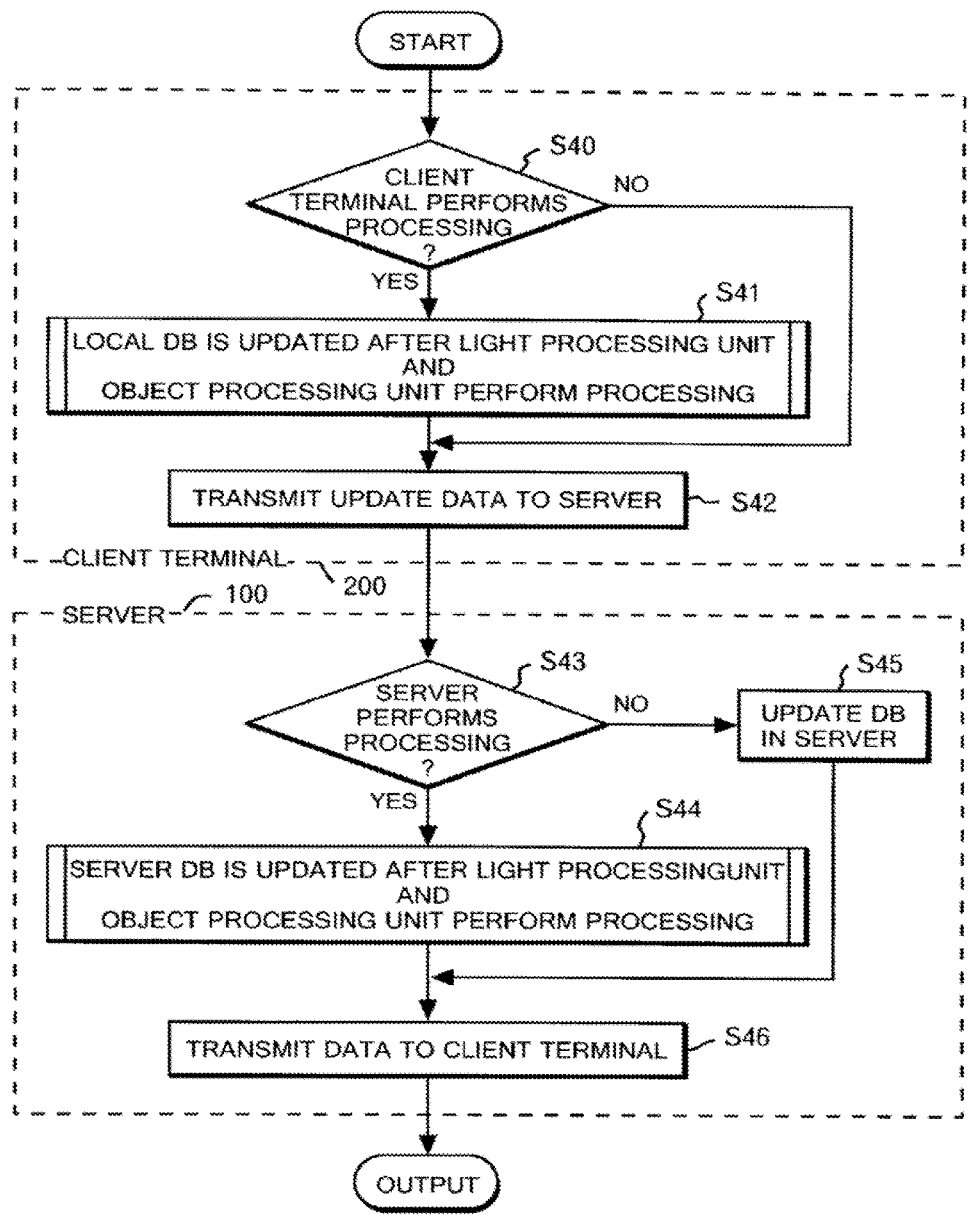
FIG. 4 shows a processing flow at a time when update information is inputted to the client terminal.

FIG. 4 shows a processing flow for a case where update information is inputted to the client terminal. When the update information is inputted to the client terminal through the input unit 227 such as a keyboard, the client information update unit 226 determines whether or not the client terminal performs processing for the inputted information (S40). If the virtual world component specified by the inputted information is a light or an object, the client terminal performs the processing for the inputted information. If the client information update unit 226 determines that the client terminal is to perform the processing, the information is transmitted to the object processing unit 224 or the light processing unit 225, and then the processing result is reflected in the avatar DB 212 and the 3D model DB 214 (S41). Regardless of whether the client terminal performs the processing, the update information is transmitted from the client information update unit 226 to the server information update unit 126 in the server (S42).

Next, the server determines whether or not to perform processing (S43). If the virtual world component indicated by the update information is a speech or a chat, the server performs the processing for the inputted information. If the server chooses to perform the processing, the information is transmitted to the speech processing unit 121 or the chat processing unit 122, and one of the corresponding DBs in the server is updated as a result of the processing (S44). Specifically, if the inputted information is update information of the speech, the speech DB 111 is updated. Meanwhile, if the inputted information is update information of the chat, the chat DB 113 is updated. Even though the server does not perform the processing for the inputted information, the avatar DB 112 and the 3D model DB 114 in the server are updated if necessary (S45). This update is for causing the update information of the client terminal to be reflected in another client terminal. The update results of the DBs in the server are transmitted from the server information update unit 126 to the client information update unit 226 (S46), and the results are outputted through a screen, a speaker and the like of the output unit 228. Note that if the pseudo wall object performs the filtering, the processing units in both the client terminal and the server perform the filtering processing using the respective pseudo wall object DBs 110 and 210. In the server, particularly, the filtering unit 123 is called to perform the processing by the speech processing unit 121 and the chat processing unit 122.

Hereinafter, descriptions will be given for a function and minimum necessary data items for each of the DBs. Each of a pair of the avatar DBs 112 and 212, a pair of the 3D model DBs 114 and 214 and a pair of the pseudo wall object DBs 110 and 210 respectively included in the server and the client terminal has the same function and data items. Accordingly, the function and data items will be explained collectively for each pair of the two DBs.

Speech DB 111

This is a DB for storing, for each piece of speech data, an avatar making speech, an addressed avatar and the piece of speech data. The Speech DB 111 stores the following data items:
  An avatar ID generating speech,
  An addressed avatar ID, and
  Speech data.

Avatar DB 112 and 212

This is a DB for storing, for each avatar, the avatar ID, and the 3D model of the avatar. The avatar DB stores the following data items:
  An avatar ID, and
  A 3D model.

Chat DB 113

This is a DB for storing, for each piece of chat data, an avatar transmitting the piece of chat data, an addressed avatar and the piece of chat data. The Chat DB 113 stores the following data items:
  An avatar ID transmitting chat data,
  An addressed avatar ID, and
  Chat data.

3D Model DBs 114 and 214

This is a DB for storing the ID and the 3D model of each material or background object. The 3D model DB stores the following data items:
  A material or background object ID, and
  A 3D model Pseudo Wall Object DBs 110 and 210

This is a DB for storing the information on each pseudo wall object. The pseudo wall object DB stores the following data items:

A pseudo wall object ID
A 3D model
A forward direction (normal) definition
A speech filter (forward direction)
A speech filter (reverse direction)
A chat filter (forward direction)
A chat filter (reverse direction)
A light filter (forward direction)
A light filter (reverse direction)
An object filter (forward direction)
An object filter (reverse direction)

The shapes of objects are set in 3D models in the 3D model DBs 114 and 214, and in the pseudo wall object DBs 110 and 210. The pseudo wall object DBs 110 and 210 each have information on a wall shape and a wall transparency such as a thin wall like a curtain and a transparent wall like a glass. A wall invisible to the avatars can also be set.

Here, the filter information indicates a combination of a filtering function corresponding to each moving direction of a virtual world component and information related to the function. In this embodiment, the filter information for each of the pseudo wall object DB s 110 and 210 includes the forward direction (normal) definition, the speech filter (forward direction), the speech filter (reverse direction), the chat filter (forward direction), the chat filter (reverse direction), the light filter (forward direction), the light filter (reverse direction), the object filter (forward direction), and the object filter (reverse direction). The filtering function of a filter for virtual world components, such as the speech filter, can be roughly categorized into two types: pass/no-pass and transformation functions. Each or both of the two filtering functions are defined for each of the filters. The pass/no-pass function is to allow or not to allow a virtual world component to pass through a pseudo wall object. The transformation function is to transform a virtual world component into a different component when the component passes through the pseudo wall object. In particular, the pseudo wall object allowing an object to pass therethrough is called non-solid, while the pseudo wall object prohibiting an object from passing therethrough is called solid. Hereinafter, whether or not an object is allowed to pass is indicated by whether a pseudo wall object is non-solid or solid; this attribute is called a solid attribute. In addition, an item of the solid attribute can be independently defined in the pseudo wall object DBs 110 and 210 in order to simply define the solid attribute of a pseudo wall object regardless of a moving direction of an object, where the object is mainly an avatar.

The forward direction (normal) definition includes information for defining the front surface of a pseudo wall object and the information is used to determine in which direction of the forward and reverse directions a virtual world component passes through the pseudo wall object. The filtering function is defined not only for each virtual world component but also for each of moving directions of each virtual world component in the virtual world. A direction of a virtual world component is determined according to the forward direction (normal) definition. In addition, two processing functions of each filter are separately stored for the respective moving directions of the virtual world component, i.e., the forward direction and reverse direction, when the component passes through the filter. The function of the filter in the reverse direction for the virtual world component is not necessarily the reverse of that in the forward direction.

Precisely, even if the function of a certain filter in the forward direction is to translate a virtual world component from English to Japanese, the function of the filter in the reverse direction is not limited to the function of reversely translating a virtual world component from Japanese to English.

The pseudo wall object can function as a speech filter for a virtual world component in the forward direction and can function as a light filter for a virtual world component in the reverse direction. Moreover, a pseudo wall object can function as a filter for several kinds of virtual world components passing in one of the directions. Thus, the function of a single pseudo wall object is not necessarily limited to the one for only a single kind of virtual world component. This is apparent from the fact that the pseudo wall object DBs 110 and 210 have the processing function items for several kinds of virtual world components with respect to a single pseudo wall object.

In addition, in order to process a single kind of virtual world component through multiple different kinds of filtering, a single pseudo wall object can have multiple filtering functions, or, alternatively, multiple pseudo wall objects having different functions can be superposed on one another. An example of multiple pseudo wall objects superimposed on one another is the implementation of a function of converting speech in Japanese at a normal speed into the speech in English at a slow speed. This function is implemented by superimposing a pseudo wall object of translating Japanese into English on a pseudo wall object of changing a speaking speed. In this way, the superimposing of pseudo wall objects enables various conversions.

The avatar can freely create and delete a pseudo wall object. For instance, the user of an avatar can create a pseudo wall object having a necessary function when the avatar makes conversions with another avatar and he or she can delete the pseudo wall object when the conversations are finished. Otherwise, a computer can automatically create a pseudo wall object as circumstances demand. For example, a computer can capture information on an avatar approaching a particular advertisement and can automatically create a pseudo wall object according to the captured information to show the content suitable for the avatar.

In order to filter the speech or chat, a pseudo wall object is created between objects having a verbal conversation or chat. Meanwhile, in order to perform the light filtering, a pseudo wall object can be created around an object for which the light filtering is desired. Such an object has an appearance that is different from another object or views another object differently. Such creation of a pseudo wall object surrounding an object is needed for the light filtering, because the speech filtering and chat filtering are targeted for particular objects while the light filtering and object filtering are targeted for a large number of unspecified objects in some cases.

Figure 5:
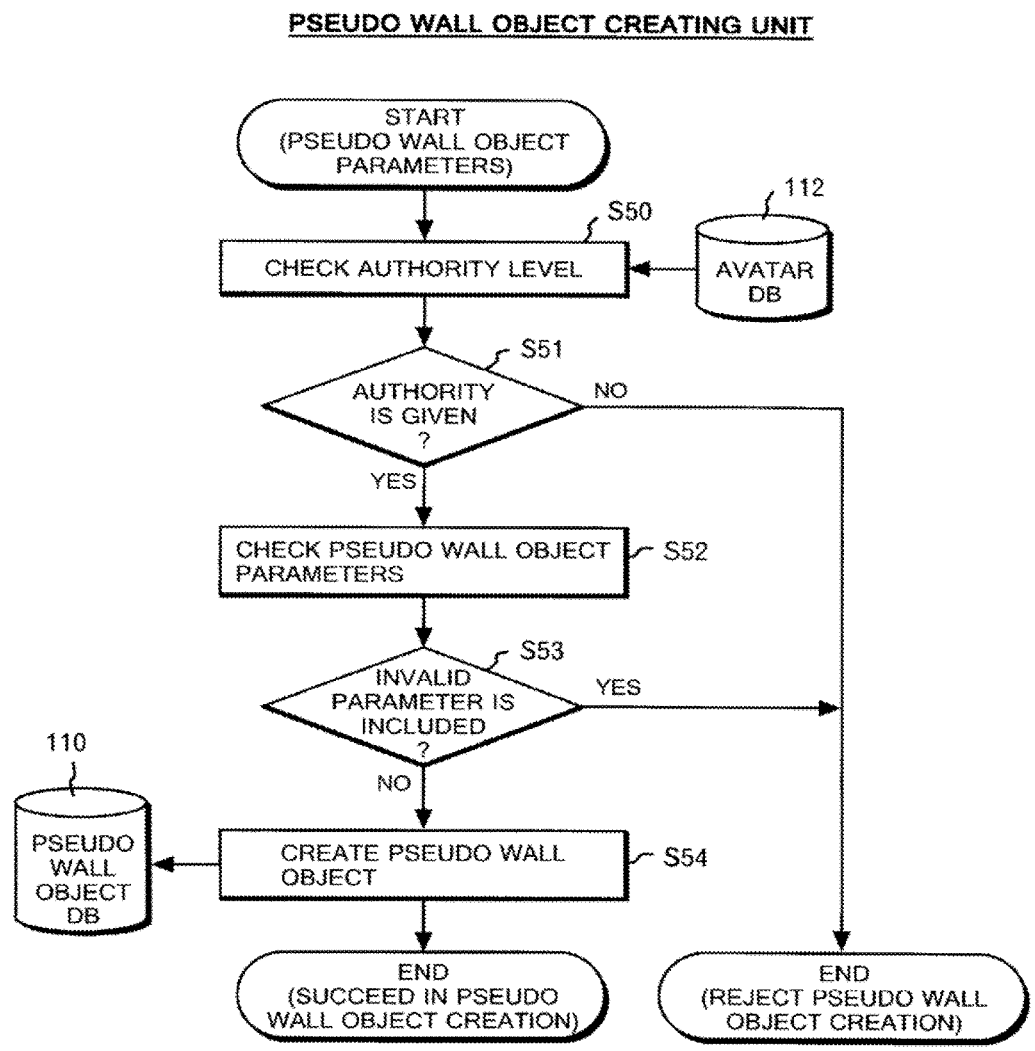
FIG. 5 shows a processing flow in a pseudo wall object creating unit.

FIG. 5 shows a processing flow in the pseudo wall object creating unit 120. The pseudo wall object creating unit 120 starts the processing upon receipt of parameters for a pseudo wall object when a command to create the pseudo wall object is issued in response to an instruction by a user or in response to a determination by a computer. The pseudo wall object creating unit 120 obtains the information on the authority level from the avatar DB 112 (S50) and checks the authority level (S51). If authority is given, the pseudo wall object creating unit 120 checks the configuration parameters of the pseudo wall object (S52) and determines whether or not the parameters include an invalid parameter (S53). If no invalid parameter is included, the pseudo wall object creating unit 120 creates a pseudo wall object, stores the information on the created object in the pseudo wall object DB 110 (S54), and then terminates the processing. In contrast, if authority is not given, or if an invalid parameter is included, the pseudo wall object creating unit 120 terminates the processing without creating any pseudo wall object. The pseudo wall object thus created has a filtering function for a virtual world component.

Hereinafter, descriptions will be provided for the filtering function of a pseudo wall object for each kind of virtual world components. The specific examples will be described below as Examples 1 to 6.

Speech Filtering

An embodiment of the present invention includes the pseudo wall object having the speech filter function. A speech made by an avatar is converted when passing through the pseudo wall object having the speech filter, and thereby another avatar listens to the converted speech. As described above, the speech is processed by the speech processing unit 121 in the server.

Figure 6:
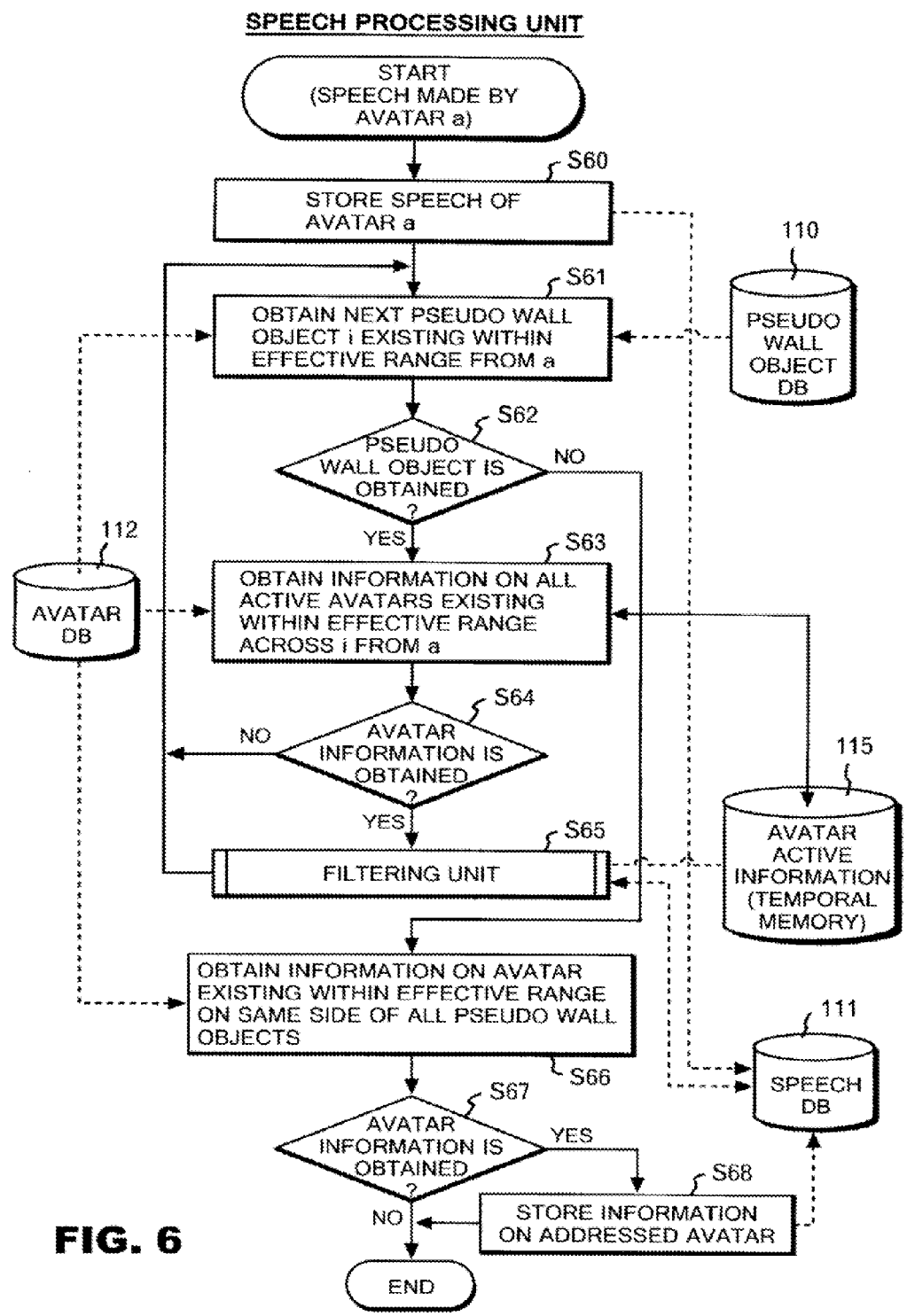
FIG. 6 shows a processing flow in a speech processing unit.

FIG. 6 shows a filtering processing flow in the speech processing unit 121. When the user of an avatar 'a' inputs a speech through the input unit 227 such as a microphone, the speech inputted to the speech DB 111 is stored through the information update units 226 and 126 respectively in the client terminal and in the server (S60). Thereafter, from the pseudo wall object DB 110, the speech processing unit 121 obtains the information on a pseudo wall object existing within the reach of the speech from the avatar 'a' (S61). A range of the reach of the speech can be set by the user of the avatar 'a', or can be automatically set. The range is specified by use of the avatar IDs, the distance from the avatar making the speech, or the like. The speech processing unit 121 determines whether or not the information on the pseudo wall object is obtained in S61 (S62). If the information is obtained, the speech processing unit 121 obtains, from the avatar DB 112 and avatar active information 115, the information on all the active avatars existing within the effective range across the pseudo wall object 'i', the information of which is obtained from the avatar 'a' in S61 (S63). This obtaining is performed in order to store the speech in the speech DB 111, in association with addressed avatars. The avatar active information 115 will be described later in the description of the filtering unit 123.

The speech processing unit 121 determines whether or not the information on the avatars is obtained in S63 (S64). If the information is obtained, then the filtering unit 123 starts processing, and updates the speech DB 111 after processing the speech through the filter (S65). The filtering unit 123 will be described in more detail later. If there are two or more pseudo wall objects, the steps S61 to S65 are repeatedly executed a number of times as many as the number of the pseudo wall objects, either after it turns out that the information on any avatar is not obtained in S64, or after the filtering unit 123 completes the processing in S65. After that, the speech processing unit 121 obtains the information on an avatar existing within the reach of the speech on the same side of the pseudo wall object 'i' as the avatar 'a' (S66). If the avatar information is obtained (S67), the speech processing unit 121 stores the speech information in the speech DB 111 in association with the addressed avatar (S68).

Chat Filtering

The pseudo wall object can have a chat filter function. The pseudo wall object having the chat filter function converts a text document inputted by an avatar, and thus another avatar can read the text document thus converted. In addition, an avatar can also read a text document in the virtual world after the pseudo wall object having the chat filter function converts the text document. As described above, the chat processing unit 122 in the server performs the processing for chat.

Figure 7:
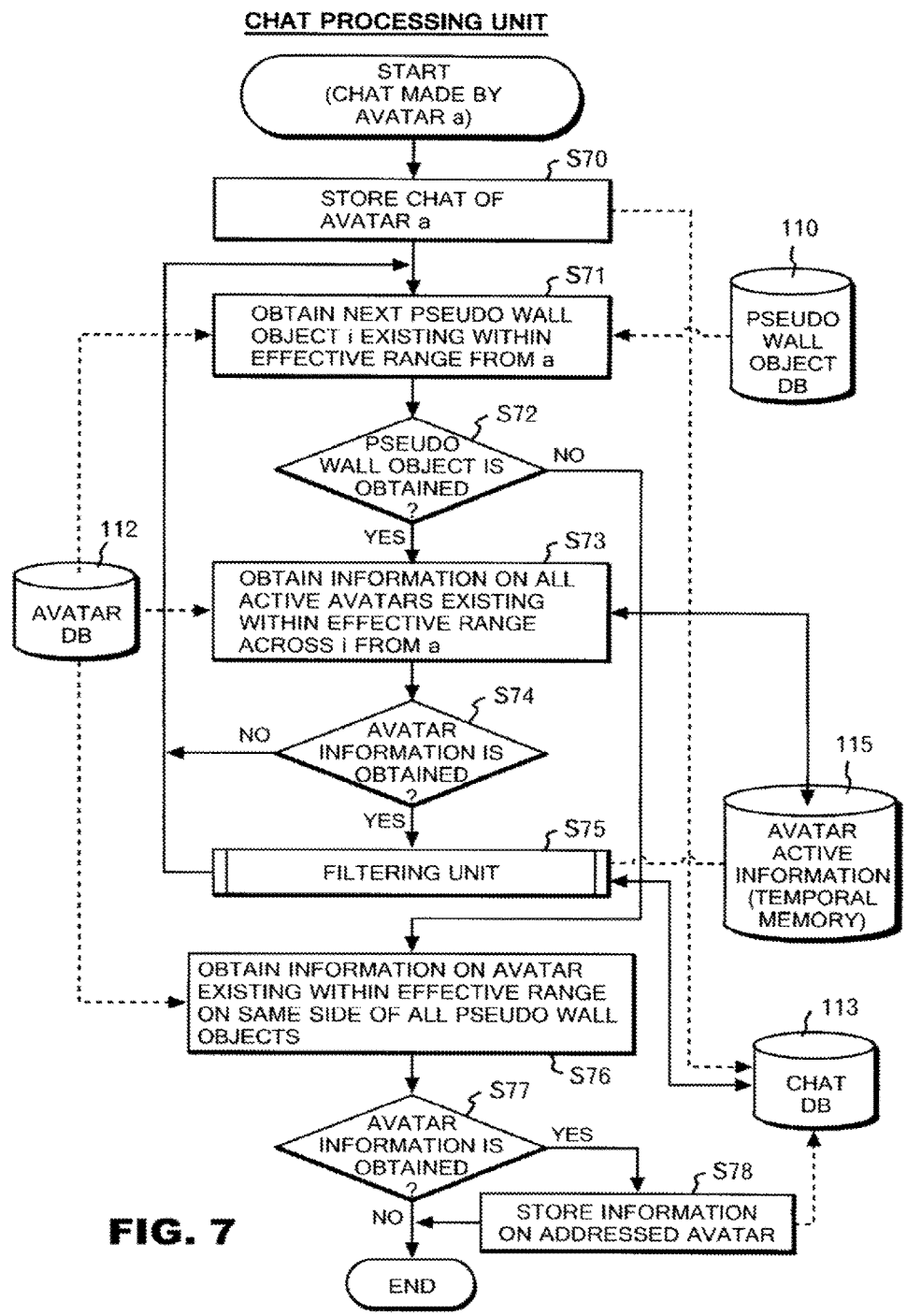
FIG. 7 shows a filter processing flow in a chat processing unit.

FIG. 7 shows a filter processing flow in the chat processing unit. Here, the processing for chat between avatars is explained. At first, when the user of the avatar 'a' inputs a text document from the input unit 227 such as a keyboard, the text document is inputted and stored into the chat DB 113 through the information update units 226 and 126 of the client terminal and the server, respectively (S70). Next, the chat processing unit 122 obtains, from the pseudo wall object DB 110, the information on the pseudo wall object existing within the reach of the chat from the avatar 'a' (S71). A range of the reach of the chat can be set by the user of the avatar 'a', or can be automatically set by distance. The chat processing unit 122 determines whether or not the information on the pseudo wall object is obtained in S71 (S72), and then obtains, from the avatar DB 112 and the avatar active information 115, the information on all the active avatars existing within the effective range across the pseudo wall object 'i', the information of which is obtained from the avatar 'a' in S72 (S73). Here, the avatar active information 115 is temporarily memorized information. The avatar active information 115 will be described later in the description of the filtering unit 123.

The chat processing unit 122 determines whether the information on the avatars is obtained in S73 (S74). If the information is obtained, then the filtering unit 123 starts processing, and updates the chat DB 113 after processing the text document through the filter (S75). The filtering unit 123 will be described in more detail later. If there are two or more pseudo wall objects, the steps S71 to S75 are repeatedly executed a number of times as many as the number of the pseudo wall objects, either after it turns out that the information on any avatar is not obtained in S74 or after the filtering unit completes the processing in S75. After that, the chat processing unit 122 obtains the information on an avatar existing within the reach of the chat on the same side of the pseudo wall object as the avatar (S76). If the avatar information is obtained (S77), the chat processing unit 122 stores the chat information in the chat DB 113 in association with the addressed avatar (S78).

Figure 8:
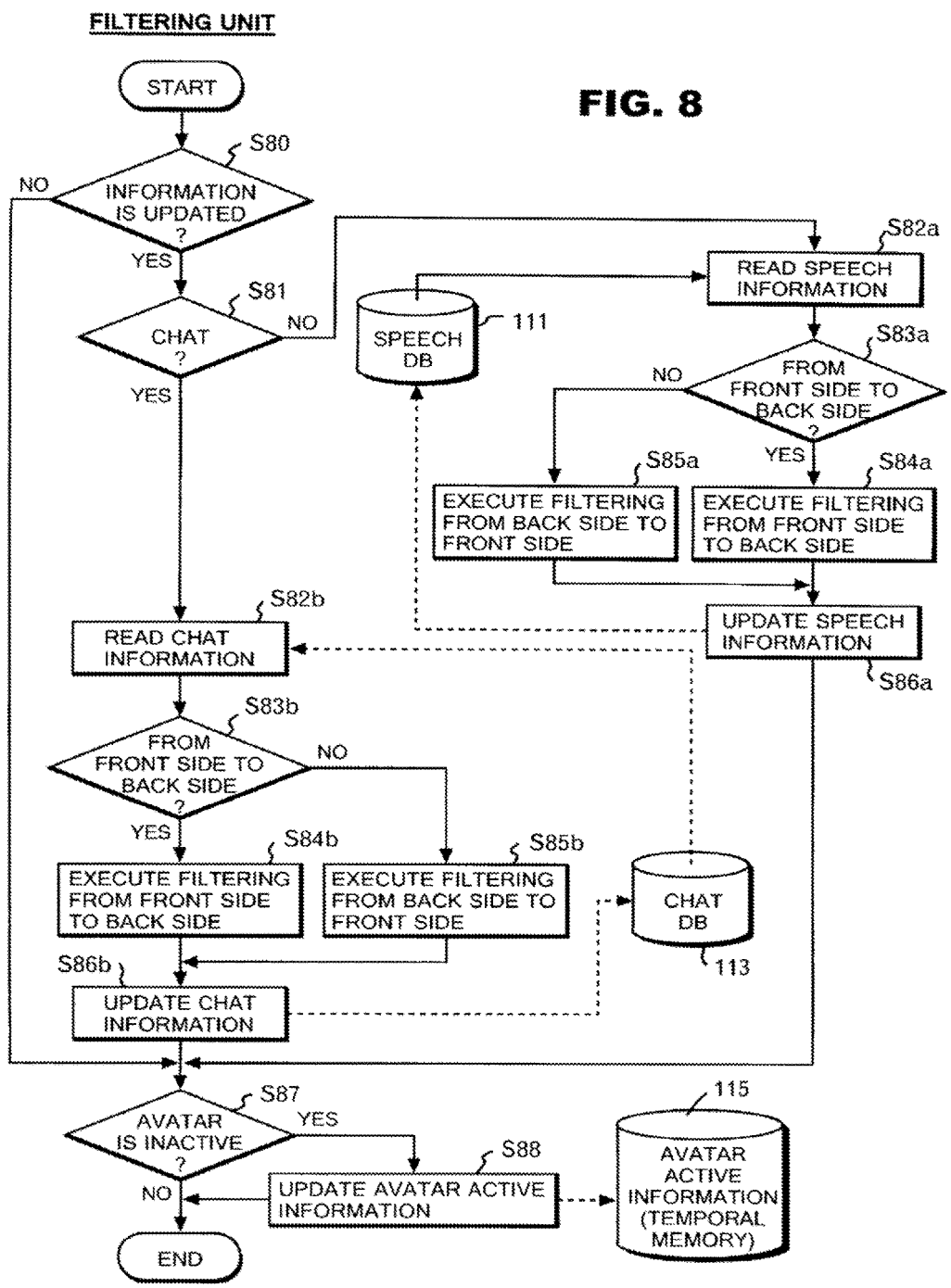
FIG. 8 shows a processing flow in a filtering unit.

Hereinafter, the filter processing in the speech processing unit and the chat processing unit will be described. FIG. 8 shows a processing flow of the filtering unit 123. The filtering unit 123 determines whether or not the update information is inputted (S80). If the update information is inputted, the filtering unit 123 performs the filter processing. When the update information is inputted, the filtering unit 123 determines whether the update information is for chat (S81). If the update information is not for chat, the filtering unit 123 filters the update information as that for speech. Specifically, the filtering unit 123 obtains the data from the speech DB 111 (S82a), and determines whether a direction of the update information relative to the pseudo wall object is the forward direction (S83a). If it is the forward direction, the filtering unit 123 performs the speech filtering (forward direction) defined in the pseudo wall object DB 110 (S84a). In contrast, if the direction of the update information is the reverse direction, the filtering unit 123 performs the speech filtering (reverse direction) defined in the pseudo wall object DB 110 (S85a). After the execution of the filtering, the filtering unit 123 updates the information in the speech DB 111 to the information obtained through the speech filter (S86a).

If the update information is for chat, the filtering unit 123 performs processing similar to the case of processing the update information for speech. Specifically, the filtering unit 123 obtains the data from the chat DB 113 (S82*b*), and determines whether a direction of the update information relative to the pseudo wall object is the forward direction (S83*b*). If it is the forward direction, the filtering unit 123 performs the chat filtering (forward direction) defined in the pseudo wall object DB 110 (S84*b*). In contrast, if the direction of the update information is the reverse direction, the filtering unit 123 performs the chat filtering (reverse direction) defined in the pseudo wall object DB 110 (S85*b*). After the execution of the filtering, the filtering unit 123 updates the information in the speech DB 111 to the information obtained through the speech filter (S86*b*). If after S80 there is no update information or if after the chat DB 113 or the speech DB 111 is updated, there is update information, the filtering unit 123 determines whether or not an avatar existing within the reach of speech or chat is inactive (S87). If the avatar is inactive, the filtering unit 123 updates the avatar active information 115 (S88). When an avatar is inactive, a virtual space component does not reach the inactive avatar. The filtering unit 123 excludes such an inactive avatar from the target for the speech processing by storing the information on the inactive avatar in the avatar active information 115. The avatar active information 115 is temporarily memorized in a main memory or the like.

Similarly, the pseudo wall object can also have a light filtering function. The light filtering function is for changing the appearances of the brightness and the 3D model of an object across the pseudo wall object. The processing flow is the same as the foregoing flows for speech and chat except for that a filter processing unit is included in the light processing unit. By taking the speech processing unit as an example, the processing flow of the light filtering function can be shown by replacing the speech DB 111 with the avatar DB 212 and the 3D model DB 214.

In addition, the pseudo wall object can also have an object filter function. When a pseudo wall object allows an object to pass therethrough, the object filter function is able to make a change in an object after the object passes therethrough. This function is implemented by changing the solid attribute of a pseudo wall object. The processing flow of the object processing unit is similar to that of the light processing unit. Additionally, the object processing unit performs the process of determining whether or not to allow an object to pass through the pseudo wall object according to the solid attribute of the pseudo wall object. This processing is peculiar to the object processing unit, and accordingly will be specially explained below.

Determination as to Passage of Object

The pseudo wall object is made of a solid attribute. The solid attribute determines whether or not the pseudo wall object allows avatars and the like to pass therethrough. If the pseudo wall object is non-solid, other objects can move without being influenced by the pseudo wall object. On the other hand, if the pseudo wall object is solid, the pseudo wall object does not allow other objects to pass therethrough, thus making the boundary of a space inside the virtual world. Moreover, the solid attribute can be defined in relation to a moving direction. Hence, the pseudo wall objects can form a space that allows an object to go out of the space to the outside, but not to enter the space from the outside. When its own avatar, a related object or the like attempts to pass through and move across a pseudo wall object in the forward direction, the object processing unit 224 determines whether or not the concerned object can thus move, by referring to the object filter (forward direction) in the pseudo wall object DB 110. The object filter (reverse direction) is referred to for an object attempting to pass in the reverse direction. If it is determined that the object can move, the light processing unit 225 carries out the processing for rendering an image after the movement.

Figure 9:
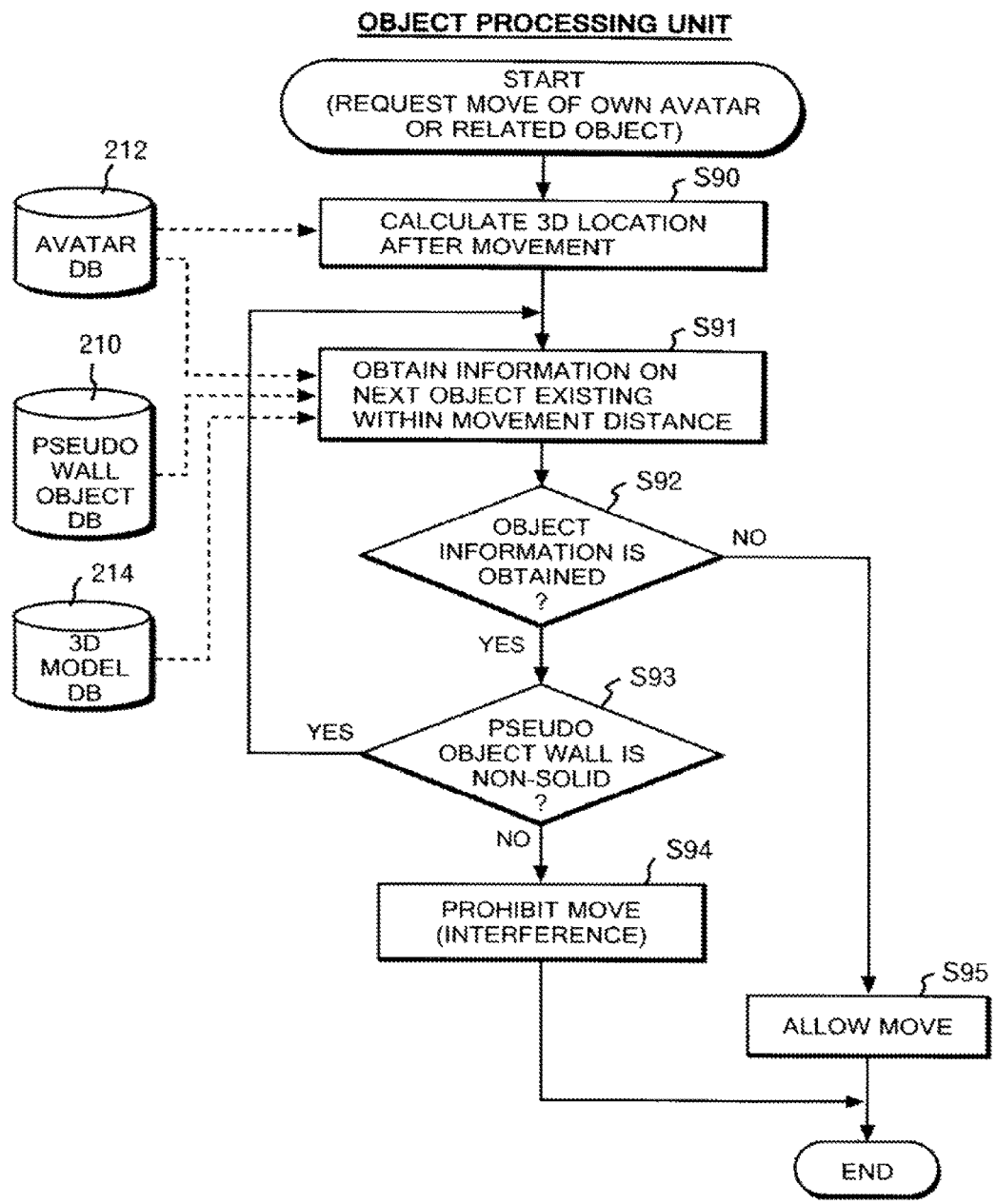
FIG. 9 shows a movement determination processing flow in an object processing unit.

FIG. 9 shows a processing flow for movement determination in the object processing unit 224. Upon receipt of a request to move the own avatar, a related object or the like, the object processing unit 224 obtains the information from the avatar DB 212 and performs calculation to obtain a new 3D location after the movement (S90). Thereafter, the object processing unit 224 obtains the information on objects existing within the movement distance from the avatar DB 212, the pseudo wall object DB 210 and the 3D model DB 214 (S91). The information on the objects existing within the movement distance is sequentially obtained in ascending order in terms of the distance from the own avatar or the related object. The object processing unit 224 determines whether or not the object information is obtained in S91 (S92). If the object information is obtained, the object processing unit 224 determines whether or not each of the objects is a non-solid pseudo wall object by referring to the object filter according to the current moving direction in the pseudo wall object DB 210 (S93). If all the pseudo wall objects are non-solid, steps S91 to S93 are repeatedly executed a number of times as many as the number of the objects existing within the movement distance. This is because the avatar can pass through all the objects if the objects are non-solid. Upon finding a solid pseudo wall object within the movement distance, the object processing unit 224 then determines that the avatar cannot move (S94) and terminates the processing. In contrast, if no solid pseudo wall object is found, the object processing unit 224 then determines that the avatar can move (S95) and terminates the processing. According to the above determination, the light processing unit 225 performs the processing for rendering and updates the information in the DBs in the client terminal and the DBs in the server.

Transparency of Pseudo Wall Object

The pseudo wall object can be set to be semi-transparent, to be full transparent though having a shape like a glass, or to be completely invisible. In this case, scenery and the like on the other side of the pseudo wall object are rendered on the screen. On the other hand, the pseudo wall object can be set to be opaque. In this case, the other side of the wall is not rendered on the screen. The light processing unit 225 (i) determines whether or not the wall is transparent and also whether or not to render the other side of the wall according to the determination on wall transparency (ii) performs the processing accompanying such determinations and necessary for rendering.

Figure 10:
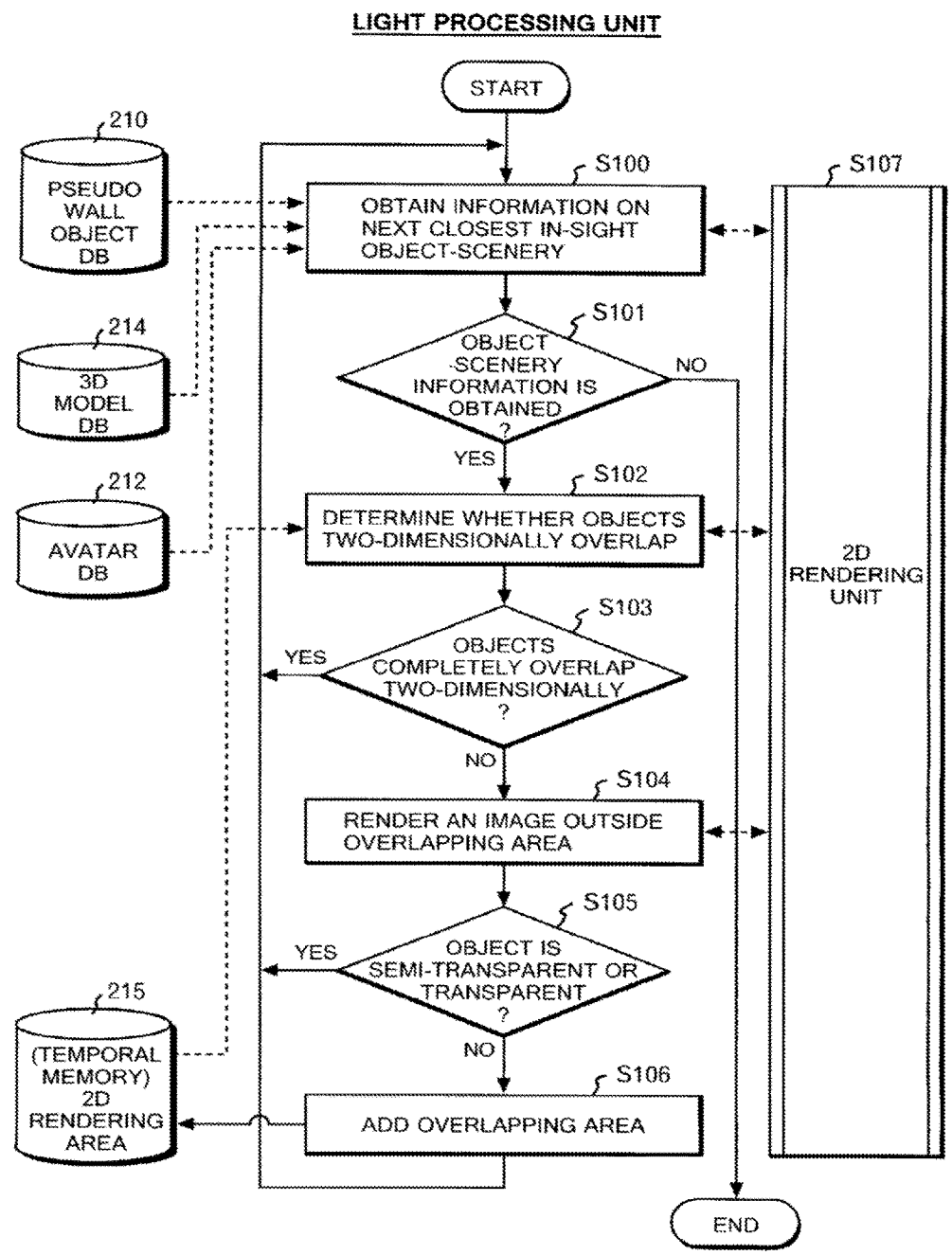
FIG. 10 shows a rendering processing flow in a light processing unit.

FIG. 10 shows a rendering processing flow in the light processing unit 225. The light processing unit 225 obtains the information on objects and scenery within a field of vision (called in-sight object-scenery information) from the pseudo wall object DB 210, the avatar DB 212 and the 3D model DB 214 (S100). The in-sight object-scenery information is obtained in ascending order in terms of the distance.

The light processing unit 225 determines whether or not the in-sight object-scenery information is obtained in S100 (S101). Then, the light processing unit 225 determines whether a new object two-dimensionally mapped from the object/scenery information obtained in S100 completely overlaps with any existing object stored in a 2D rendered area 215 (S102 and S103). This is because if a certain object exists in the front, a pseudo wall object or other objects behind the certain object are completely covered with the certain object when being rendered two-dimensionally, and thus do not need to be rendered. If the two objects do not completely overlap with each other, a 2D rendered section (S107) renders an image for a part of the new object not overlapping with the existing object (S104). The 2D rendered section is included in the light processing unit and performs processing for converting a three-dimensional image into a two-dimensional image.

If the object is not a semi-transparent or transparent pseudo wall object (S105), the light processing unit 225 adds an obtained object to overlapping areas (S106). This is because an object that is not semi-transparent or transparent obstructs the view behind the object. The overlapping areas are stored in the 2D rendered area 215 and used to determine the overlapping. The 2D rendered area 215 temporarily stores objects other than semi-transparent and transparent pseudo wall objects if the objects do not each overlap with any other object or each exist in front while overlapping with another object. The 2D rendered area 215 is a temporary memory and is memorized in a main memory or the like. Steps S100 to S106 are repeatedly executed a number of times, as many as the number of objects within the field of vision, after it turns out that the two objects completely overlap with each other, after S105 if the object is a semi-transparent or transparent wall, or after S106 if the object is not a semi-transparent or transparent wall. The processing is terminated when there are no more objects to be obtained within the field of vision.

Hereinbelow, descriptions will be provided for examples of the pseudo wall object according to an embodiment of the present invention.

Example 1

Automatic Translation Pseudo Wall Object

Figure 11:
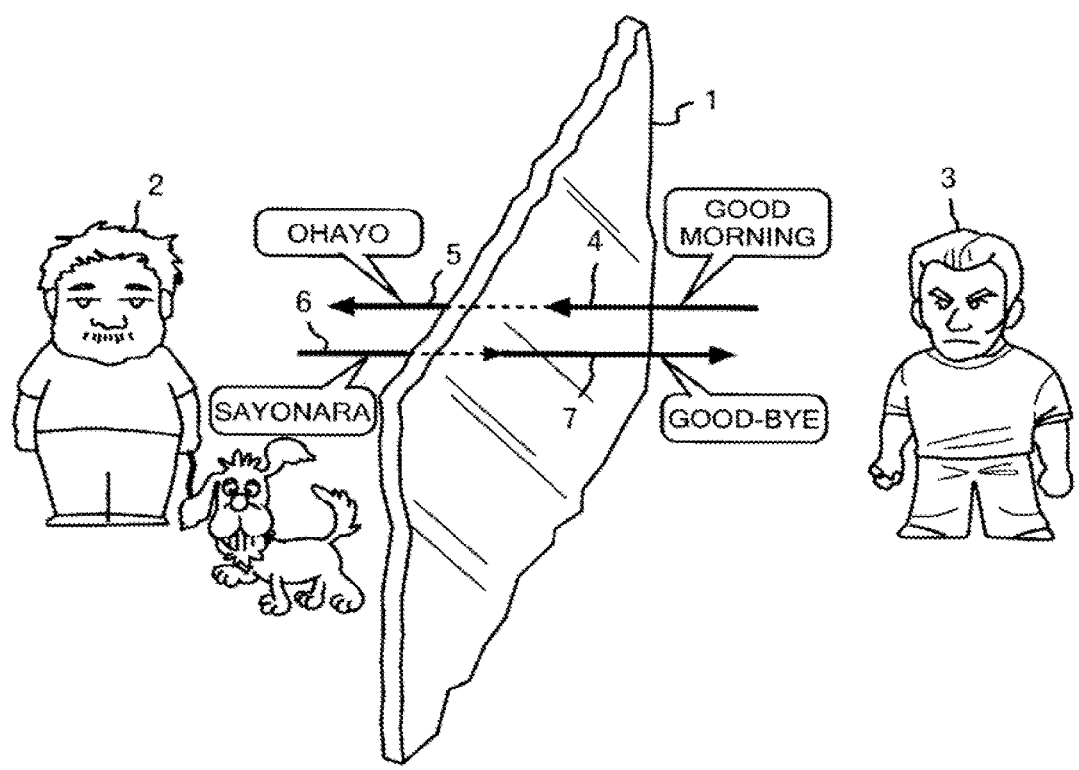
FIG. 11 shows a screen image in which an automatic translation pseudo wall object is used.

One specific example of the speech filtering of the pseudo wall object is an automatic translation pseudo wall object. FIG. 11 shows a screen image when the automatic translation pseudo wall object is used.

Consider the situation where an avatar 2 who is a Japanese speaker and an avatar 3 who is an English speaker talk to each other. In this situation, a speech 4 in English made by the avatar 3 of the English speaker is converted into a speech 5 in Japanese by an automatic translation pseudo wall object 1 and is listened to by the avatar 2 of the Japanese speaker. Conversely, a speech 6 in Japanese made by the avatar 2 of the Japanese speaker is converted into a speech 7 in English by the automatic translation pseudo wall object 1 and is listened to by the avatar 3 of the English speaker. In this case, the pseudo wall object DB 110 stores the definitions of: a direction from 3 to 2 as the forward direction (normal); a function of translating English into Japanese as the speech filter (forward direction); and a function of translating Japanese into English as the speech filter (reverse direction).

With these definitions, the automatic translation pseudo wall object 1 plays a role called an interpreter in the real world, and enables avatars speaking in different languages to have smooth conversions. The automatic translation pseudo wall object is also one specific example of the chat filtering.

Example 2

Time Operation Pseudo Wall Object

A time operation pseudo wall object is explained as another specific example of the pseudo wall object having the speech filtering function. Unlike the case of chat, when two or more avatars have a voice conversation, there is a situation where a speech of an avatar overlaps with a speech of another avatar. In this case, an avatar as a listener fails to catch each of the two speeches since the two speeches are mixed together. This problem can be solved by creating a time operation pseudo wall object. When two or more avatars make speech at the same time, the time operation pseudo wall object provides a time difference between speech timings by prioritizing speeches and thereby enables a listening avatar to listen to the speeches separately. In other words, the time operation pseudo wall object allows individual speeches of avatars to be clearly heard by preventing the speeches from being heard in an overlapping manner.

Example 3

Avatar Selection Pseudo Wall Object

Figure 12:
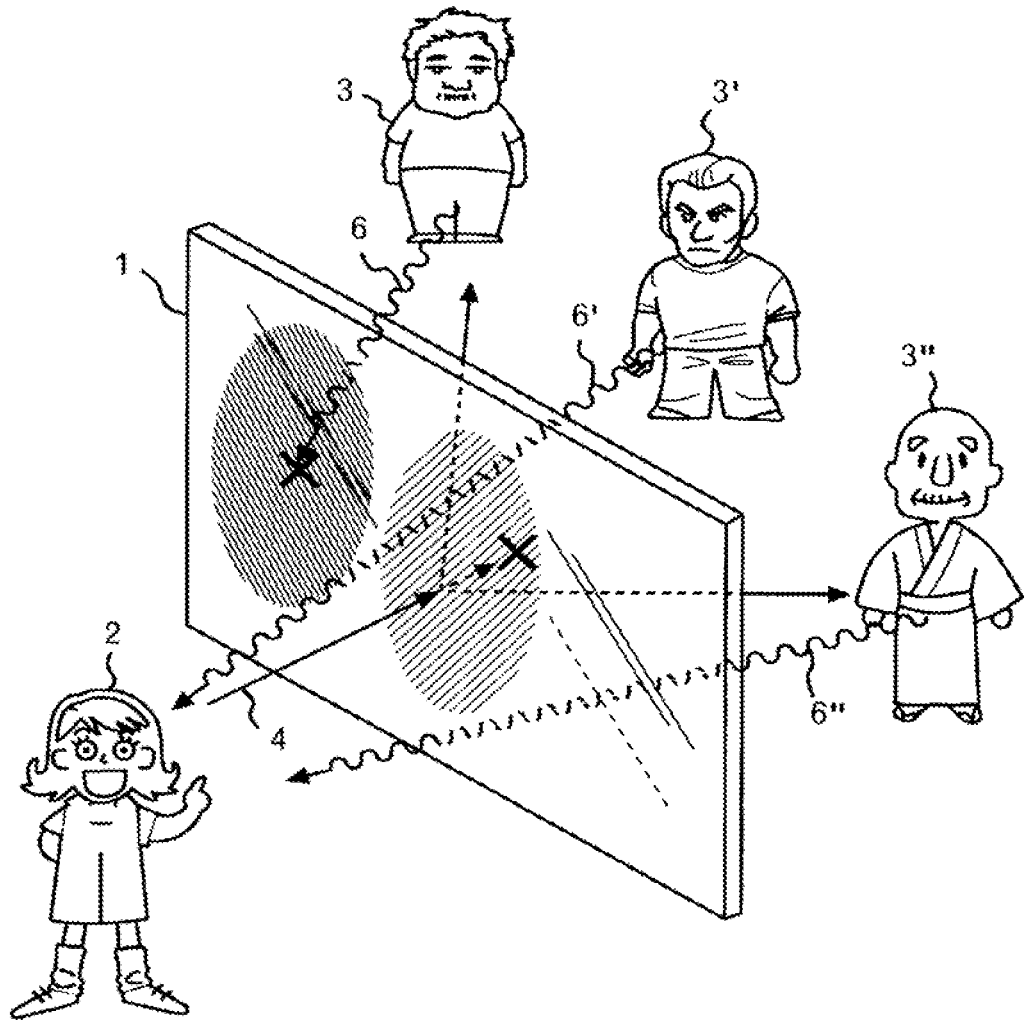
FIG. 12 shows a screen image in which an avatar selection pseudo wall object is used.

An avatar selection pseudo wall object is explained as another specific example of the pseudo wall object having the speech filtering function. FIG. 12 shows a screen image when the avatar selection pseudo wall object is used. Table 1 shows whether a speech from or to an avatar 2 is permitted when the forward direction of the pseudo wall object is defined as a direction from 2 to 3. Here, Y indicates that a speech is permitted and N indicates that a speech is not permitted.

TABLE 1

|  | AVATAR 3 | AVATAR 3' | AVATAR 3" |
|---|---|---|---|
| FROM AVATAR 2 | Y | N | Y |
| TO AVATAR 2 | N | Y | Y |

In the pseudo wall object DB 210, the contents in the upper row in Table 1 are registered in the speech filter (forward direction) and the contents in the lower row in Table 1 are registered in the speech filter (reverse direction).

Through an avatar selection pseudo wall object 1, a speech 4 of the avatar 2 is transmitted to the permitted avatars 3 and 3", but is not transmitted to the unpermitted avatar 3'. Conversely, a speech 6 of the avatar 3 is not permitted and thus not transmitted to the avatar 2, while speeches 6' and 6" of the avatars 3' and 3" are permitted and thus transmitted to the avatar 2. In other words, when an avatar desires to inform particular avatars of a certain speech while having conversations with several avatars, the avatar selection pseudo wall object enables only the particular avatars to be informed of the speech or disables only the other avatar to be informed of the speech. The avatar selection pseudo wall object is also one specific example of the chat filtering.

Example 4

Speed Change Pseudo Wall Object/Particular Word Block Pseudo Wall Object

In addition to the foregoing specific examples, a pseudo wall object can have the functions of (i) changing a voice tone, for example, changing a male voice to a female voice; (ii) changing a talking speed, for example, changing a rapid talk to a slow talk; and (iii) prohibiting only a particular word from being heard. To prohibit only a particular word from being heard is to make only a part of conversation that includes a designated particular word inaudible to a conversation partner. For example, when one utters "aiueo" while designating "ai" as a particular word, a conversation partner hears "--ueo."

Example 5

Advertisement Change Pseudo Wall Object

Figure 13:
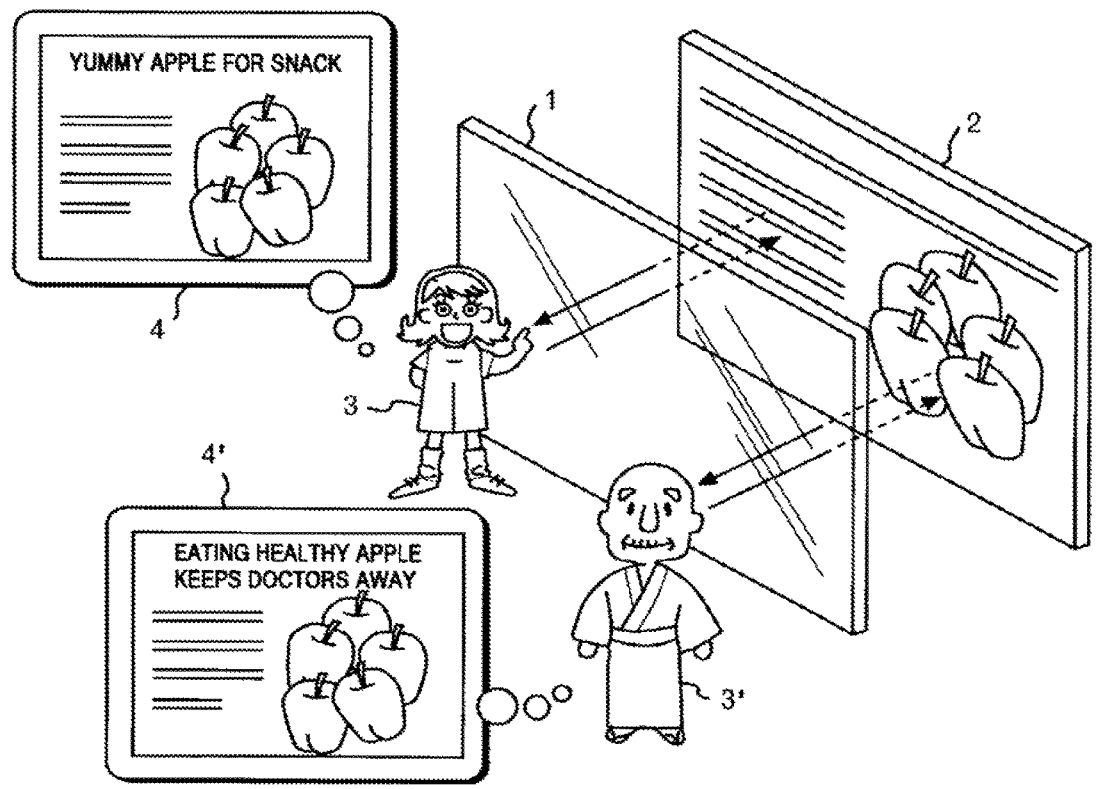
FIG. 13 shows a screen image in which an advertisement change pseudo wall object is used.

An advertisement change pseudo wall object will be described as a specific example of the chat filtering. This filtering is for transmitting a text document between an avatar and an object. FIG. 13 shows a screen image when the advertisement change pseudo wall object is used. In the screen, a child avatar 3 and old male avatar 3' watch an advertisement 2 for the same product. When the avatars 3 and 3' watch the advertisement 2 through the advertisement change pseudo wall object 1, the advertisement change pseudo wall object 1 is capable of causing the avatars 3 and 3' to view different catch-phrases 4 and 4' respectively suitable to their ages. In this way, in a situation where an avatar watches an advertisement in a virtual space, the content of the advertisement is changed according to characteristics, such as age and sex, of the avatar by installing an advertisement change pseudo wall object between the avatar and the advertisement. Besides the foregoing specific examples, such pseudo wall object is also capable of changing character attributes such as font type and font size and changing from kanji characters to hiragana characters. By use of a pseudo wall object provided with such a chat filter function, as described above, characters and texts can be changed according to the needs of each of avatar. Accordingly, the avatars are allowed to make smooth communications or to obtain and provide individually useful information.

Example 6

Day and Night Converter Pseudo Wall Object

Figure 14:
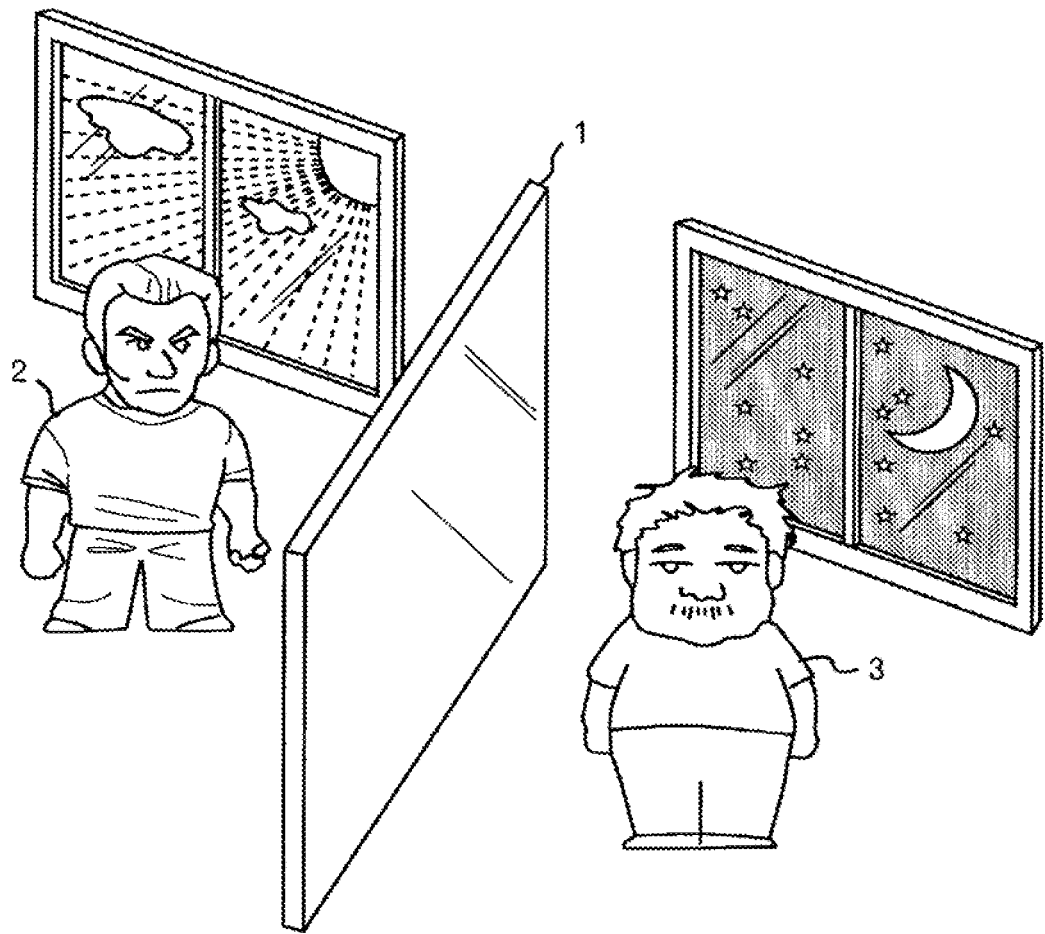
FIG. 14 shows a screen image in which a pseudo wall object having a day and night converter function is used.

A day and night converter pseudo wall object is explained as a specific example of the light filtering. FIG. 14 shows a screen image when a pseudo wall object having a function of converting day and night is used. Here, suppose the case where the virtual world is at a daytime and where an avatar 2 views an avatar 3 through the day and night converter pseudo wall object 1. In this case, the avatar 2 views the avatar 3 with a dark background as if the avatar 3 is at night. In this way, the actual time of a user of an avatar is expressed.

Example 7

3D Model Change Pseudo Wall Object

A 3D model change pseudo wall object is explained as a specific example of the light filtering. For example, when an avatar views an object through the 3D model change pseudo wall object, the 3D model change pseudo wall object allows the avatar to view the object in a magnified manner. Instead, the 3D model change pseudo wall object is also able to cause the avatar to view the object with its texture or the like changed.

Example 8

Object Selection Change Pseudo Wall Object

An object selection change pseudo wall object is explained as a specific example of the object filter. Here, a space is created for a meeting room having a pseudo wall object as its wall. The wall of the meeting room can be set to allow only authorized avatars to enter the meeting room during a predetermined time period and to allow every avatar to get out of the meeting room freely after a meeting ends. This function can exclude avatars who should not participate in the meeting and also force avatars to participate in the meeting until the meeting ends. Moreover, the object selection change pseudo wall object is also capable of changing the appearance of each of avatars, who can enter and stay in the meeting room, in a distinguishable manner according to the division and position, and restore the avatar to its original appearance after the avatar gets out of the meeting room. Specifically, the object selection change pseudo wall object is capable of changing the clothes of avatars to cause: an avatar of a user belonging to research and development to wear a white coat; an avatar of a user belonging to shop floor to wear a factory uniform; an avatar of a user belonging to a sales division to wear a business suit; and the like.

Figure 15:
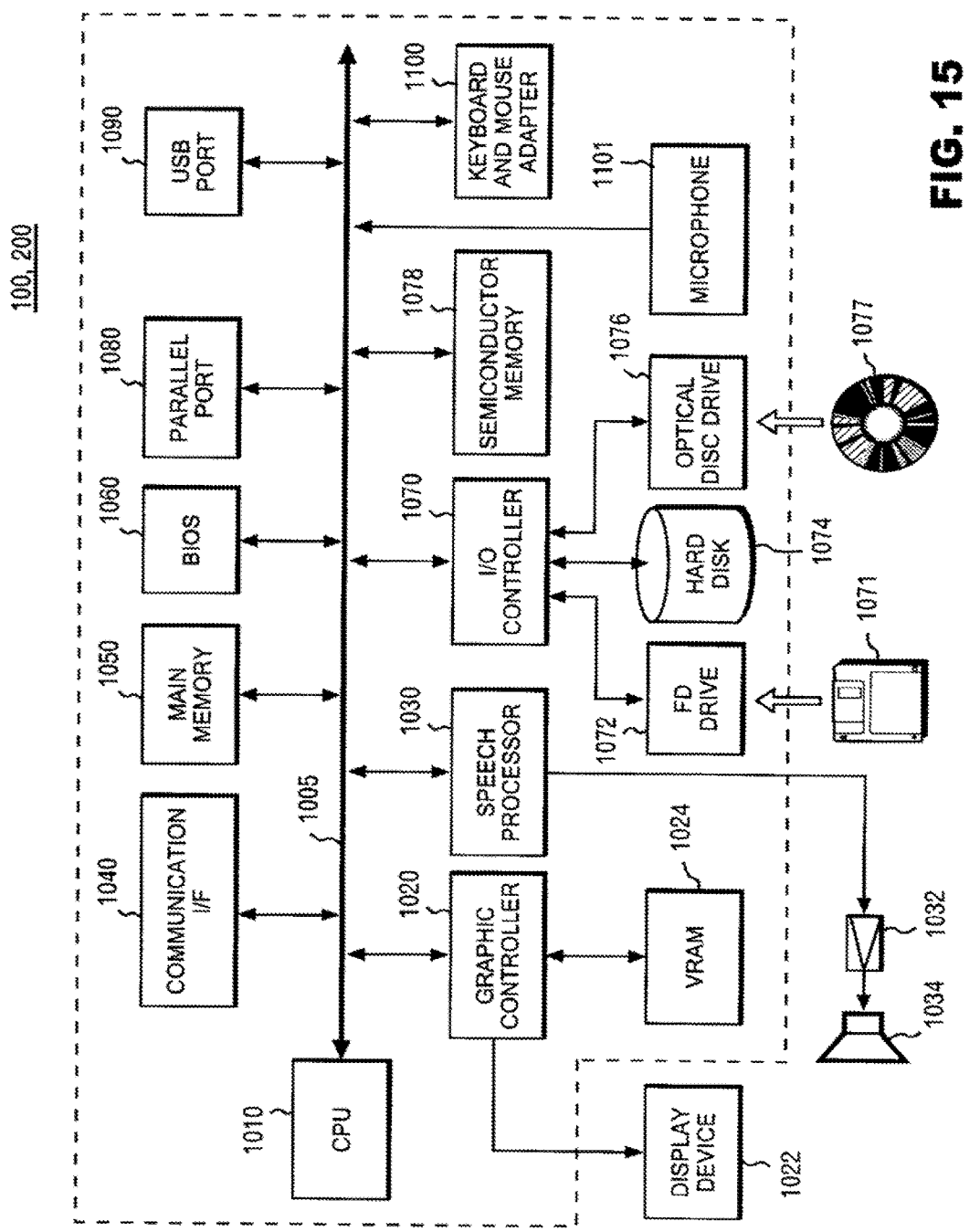
FIG. 15 shows a hardware configuration of the server or the client terminal according to an embodiment of the present invention.

FIG. 15 is a diagram showing a hardware configuration of a server or a client terminal according to an embodiment of the present invention. The following provides a description for the general configuration as an information processing apparatus typified by a computer. Needless to say, however, any minimum necessary configuration can be selected for a dedicated apparatus or a built-in device according to its use environment. Here, the server and the client terminal are collectively referred to as the client terminal/server.

The client terminal/server includes a central processing unit (CPU) 1010, a bus line 1005, a communication I/F 1040, a main memory 1050, a basic input output system (BIOS) 1060, a parallel port 1080, a USB port 1090, a graphic controller 1020, a VRAM 1024, a speech processor 1030, an I/O controller 1070, and input means such as a key board and mouse adapter 1100 and a microphone 1101. Storage units such as a flexible disk (FD) drive 1072, a hard disk 1074, an optical disk drive 1076 and a semiconductor memory 1078 can be connected to the I/O controller 1070. A display device 1022 is connected to the graphic controller 1020. In addition, an amplifier circuit 1032 and a speaker 1034 are optionally connected to the speech processor 1030.

The BIOS 1060 stores a boot program to be executed by the CPU 1010 when the client terminal/server is started up, the programs depending on hardware of the server 100, the client terminal 200, and the like. The FD drive 1072 reads a program or data from a flexible disk 1071 and provides the read program or data to the main memory 1050 or the hard disk 1074 through the I/O controller 1070.

A DVD-ROM drive, a CD-ROM drive, a DVD-RAM drive and a CD-RAM drive, for example, are usable as the optical disk drive 1076. In order to use each of the drives, it is necessary to use an optical disk 1077 in conformity with the drive. The optical disk drive 1076 also reads a program or data from the optical disk 1077 and provides the read program or data to the main memory 1050 or the hard disk 1074 through the I/O controller 1070.

A computer program provided to the client terminal/server is stored in a storage medium such as the flexible disk 1071, the optical disc 1077 or a memory card and thus is provided by a user. Instead, this computer program is read from any of the storage media via the I/O controller 1070 or downloaded via the communication I/F 1040. Then, the computer program is installed on the client terminal/server, and then executed. Operations that the computer program causes the client terminal/server to execute are the same as the operations in the foregoing client terminal/server and the description thereof is omitted here.

The foregoing computer program can be stored in an external storage medium. In addition to the flexible disk 1071, the optical disc 1077 or the memory card, a magnet-optical storage medium such as a MD and a tape medium can be used as the storage medium. Alternatively, the computer program can be provided to the client terminal/server via a communication line, by using, as a storage medium, a storage device such as a hard click or an optical disc library provided in a server system connected to a private communication line or the Internet.

The foregoing embodiment mainly explains the client terminal/server, but a computer is also capable of implementing the same functions as those of the foregoing client terminal/server. In this case, a program having the same functions is installed on the computer. Accordingly, the client terminal/server described as the embodiment can be achieved by using the foregoing method and a computer program of implementing the method.

The client terminal/server of the present invention can be obtained by employing hardware, software or a combination of hardware and software, as described above. In a case of implementation using a combination of hardware and software, a typical example is implementation of a computer system including a certain program. In this case, the certain program is loaded to the computer system and then executed, thereby the certain program causing the computer system to execute processing according to the present invention. This program is composed of a group of instructions each of which can be expressed by use of any language, code or expression. In accordance with such a group of instructions, the system can directly execute specific functions, or can execute the specific functions after either/both (1) converting the language, code or expression into another one, or/and (2) copying the instructions into another medium. As a matter of course, the scope of the present invention also includes not only such a program itself, but also a program product including a medium in which such a program is stored. A program for implementing the functions of the present invention can be stored in an arbitrary computer readable medium such as a flexible disk, a MO, a CD-ROM, a DVD, a hard disk device, a ROM, an MRAM and a RAM. In order to store the program in a computer readable medium, the program can be downloaded from another computer system connected to the system via a communication line or can be copied from another medium. Moreover, the program can be compressed to be stored in a single storage medium or divided into several pieces to be stored in several storage media.

According to the present invention, a new method can be provided for controlling communications between objects and object movements in a virtual world.

Although the embodiments of the present invention have been described hereinabove, the present invention is not limited to the foregoing embodiments. Moreover, the effects described in the embodiments of the present invention are merely enumerated examples of the most preferable effects made by the present invention and the effects of the present invention are not limited to those described in the embodiments or examples of the present invention.

We claim:

1. A method of controlling sharing of information in a virtual world by two or more computing devices connected to each other through a network of interconnected computing devices, the method comprising the steps of:

creating a third object between a first object and a second object in the virtual world when said first object and said second object transmit communication information therebetween; and filtering said communication information with said third object according to a direction of transmission of the communication information between the first object and the second object.

2. The method according to claim 1, further comprising: generating said third object around an object that transmits visual information.

3. The method according to claim 1, wherein said third object is created as a pseudo wall.

4. The method according to claim 1, wherein said third object performs different kinds of filtering according to moving directions of information and another object.

5. The method according to claim 1, wherein said third object has information defining whether or not to allow another object to pass through said third object.

6. The method according to claim 1, wherein creating includes checking an authority level to determine whether creation of said third object is permitted.

7. A non-transitory computer readable article of manufacture tangibly embodying computer readable instructions for executing the steps of a method of controlling information shared in a virtual world by a server and a plurality of users' client terminals connected to each other through a network according to claim 1.

8. A system for controlling, using a processor, sharing of information in a virtual world by two or more computing devices connected to each other through a network of interconnected computing devices, the system comprising:

a memory coupled to the processor, the processor being configured to control the sharing of information by:
generating a third object between a first object and a second object in the virtual world when said first object and said second object transmit communication information therebetween;
storing information on said third object; and
said communication information with said third object according to a direction of transmission of the communication information between the first object and the second object.

9. The system according to claim 8, wherein said third object creating unit creates said third object around an object that transmits visual information.

10. The system according to claim 8, wherein said third object storage unit holds filtering information for performing different kinds of filtering according to moving directions of information and another object.

11. The system according to claim 8, wherein said third object storage unit holds information defining whether or not to allow another object to pass through said third object.

12. The system according to claim 8, wherein said client terminal performs processing for visual information and information on a movement of an object.

13. The system according to claim 8, wherein said server performs processing for said communication information.

14. The system according to claim 8, wherein said third object creating unit checks an authority level for creating said third object to determine whether creation of said third object is permitted.

15. A server for controlling, using a processor, sharing of information in a virtual world by two or more computing devices connected to each other through a network of interconnected computing devices, the server comprising:

a memory coupled to the processor, the processor being configured to control the sharing of information by:

transmitting and receiving information to and from the two or more computing devices;

creating a third object between a first object and a second object when said first object and said second object transmit communication information therebetween;

storing information on said third object in the memory;

filtering the communication information received from said information update unit according to a direction of transmission of the communication information between the first and the second object; and storing (i) said communication information received from said information update unit and (ii) said communication information filtered by said filtering processing unit in the memory.

16. The server according to claim 15, wherein said third object creating unit creates said third object around said object that transmits visual information.

17. The server according to claim 15, wherein said third object is created as a pseudo wall.

18. The server according to claim 15, wherein said filtering processing unit performs different kinds of filtering according to moving directions of information and another object.

19. The server according to claim 15, wherein the third object storage unit includes information defining whether or not to allow another object to pass through said third object.

20. The server according to claim 15, further comprising:
a visual information storage unit;
a movement information storage unit; and
a communication information storage unit;
wherein said visual information storage unit, said movement information storage unit and said communication information storage unit respectively stores, through said information update unit, visual information, information on movements of objects, and said communication information received from said client terminals.

* * * * *